May 10, 1949.   H. R. DAVIES   2,470,069
CENTER OF GRAVITY AND WEIGHT INDICATOR

Filed Feb. 10, 1944   2 Sheets-Sheet 1

INVENTOR
Henry Richard Davies.
BY John R. Tarbox
ATTORNEY

May 10, 1949.     H. R. DAVIES     2,470,069
CENTER OF GRAVITY AND WEIGHT INDICATOR
Filed Feb. 10, 1944     2 Sheets-Sheet 2
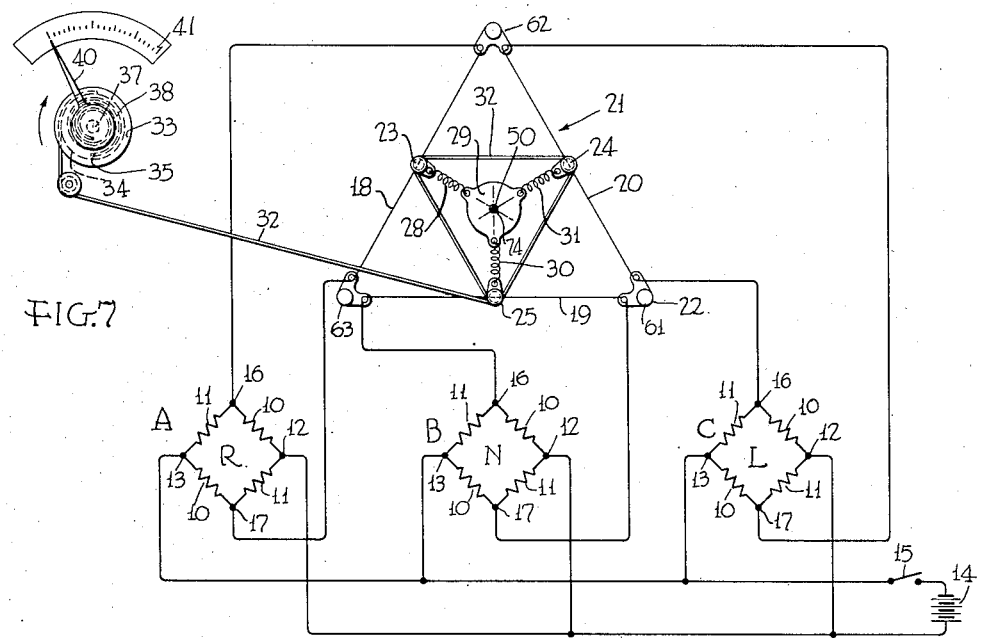
FIG.7
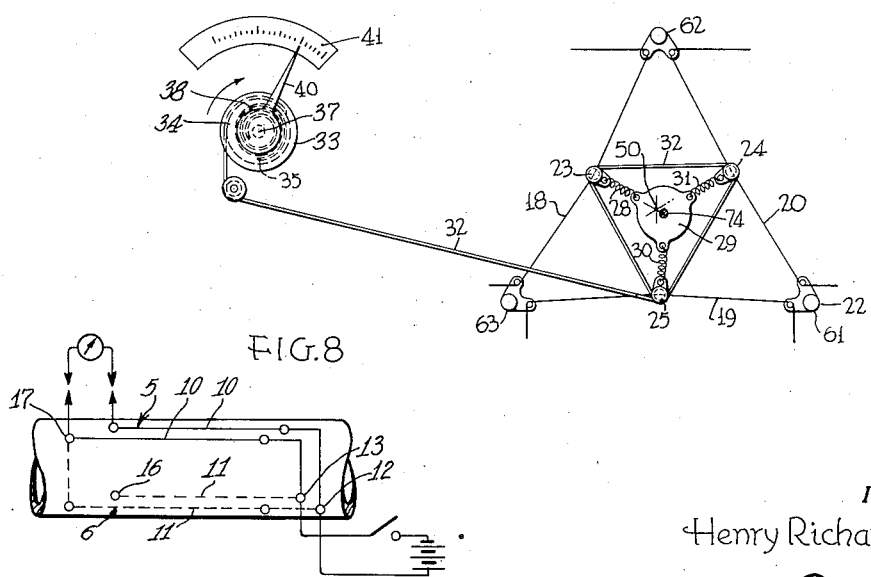
FIG.8
FIG.4
INVENTOR
Henry Richard Davies
BY John P. Tarbox
ATTORNEY Patented May 10, 1949

2,470,069

UNITED STATES PATENT OFFICE 2,470,069

CENTER OF GRAVITY AND WEIGHT INDICATOR

Henry Richard Davies, Philadelphia, Pa., assignor to The Budd Company, Philadelphia, Pa., a corporation of Pennsylvania Application February 10, 1944, Serial No. 521,799

9 Claims. (Cl. 73—65)

This invention relates to apparatus for indicating the weight and the approximate center of gravity of a body.

The invention has general application but for the purposes of this disclosure will be described in connection with a cargo airplane to which the apparatus may be applied with pronounced utility.

In airplanes employed for carrying cargo such as express, mail or freight, it is of importance that the load be distributed in such a manner in the cargo space that the equilibrium for flying will not be disadvantageously affected. A concentration of weight on the side of the cargo space producing a list will tend to make steering difficult. A concentration of weight in the fore or aft sections of the fuselage will cause difficulty in maintaining a level keel in cruising speeds. Thus it becomes important that means be provided for indicating an approximate center of gravity of the cargo load. This indicating means does not necessarily have to give results as exact as may be derived by calculation. A visual or approximate indication is considered satisfactory for this purpose.

In addition to means for indicating the gravity center of cargo load it is of importance to determine cargo weight so that the plane may not be overloaded for the proposed range of flight and to meet the requirements of take-off and landing. Automatic means available on the instrument board of the cockpit would suitably meet the requirements of weight determination for flying purposes.

It is one of the important objects therefore of the present invention to provide means for indicating in a piece of apparatus having common parts both the total weight of the cargo load and the center of gravity thereof. An object also is to provide means which may be readily applied to existing aircraft structure without extensive modifications of parts. Still another object is to provide an indicator of the type mentioned which will function with electrical apparatus essentially and which may be combined with existing electrical power sources on the airplane. An object also is to provide apparatus of the type mentioned which is simple in arrangement and involves a minimum number of essential parts for effective operation.

The above objects are met in the apparatus and associated circuits hereinbelow described with specific reference to cargo aircraft and as shown in the accompanying drawings, in which:

Fig. 4 is a detail similar to Fig. 3 with the strut rotated 90° and showing both upper and lower wire connections;

Fig. 7 shows a wiring circuit used in connection with the weight indicators; and Fig. 8 is a detail of the weight indicators near the off center load as contained in the cargo space.

Stress controlled electrical resistance wire may be used on a load supporting body to determine the weight of the load.

In a satisfactory installation, resistance wires having certain desirable characteristics, such as proper load temperature coefficient for temperature changes and adequate tensional strength, are applied to the surface of a supporting strut and attached thereto by any appropriate means. Preferably the wire should be placed in zig-zag fashion so as to increase the total length of the wire for a given length of strut since the variation in length through tension or compression is a direct function of the total length of the wire. Each limited section of the wire is fixedly secured to the supporting base so as to have direct movement with the base material.

Figure 3:
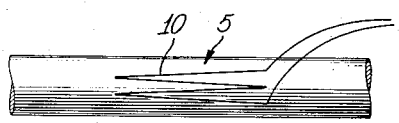
Fig. 3 is a detail showing diagrammatically the mode of applying the resistance wire to the strut or other support of the plane.
Figure 5:
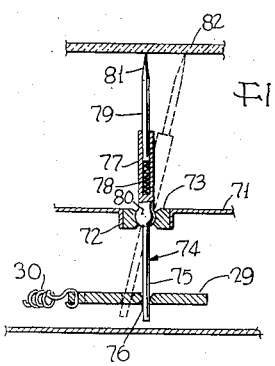
Fig. 5 is a detail of the indicator for showing the center of gravity.

As shown in Figures 3 and 4, resistance wires are applied to both sides of a strut in two separate units 5 and 6, one on each side so that if the strut is subjected to stresses to give a convex curvature on the top side, the top wires of unit 5 will be subjected to tension and the bottom wires of unit 6 subjected to compression. Each unit is formed of two separate resistance wire sections, the upper unit, for example, contains wires 10—10 and the bottom unit wires 11—11. In Figure 7 the specific mode of connecting the resistance wires is indicated in the bridge circuits bearing the legends R, N and L, indicating "right," "nose," and "left." In this figure wires 10 correspond to the top wires in Fig. 4 and wires 11 to the bottom wires. It will be seen from this figure that the top and bottom wires 10 and 11 are connected together as bridge circuits, generally indicated by the letters A, B and C, the A bridge having connection to a strut in the fork of the right landing gear wheel, and B to a fork in the nose landing gear and C having connection to a strut in the left landing gear wheel. In each bridge the resistances 10 and 11 are connected alternatively in series with junctions 12 and 13, common points being connected together and to one side of a battery 14. A switch 15 is provided for closing the circuit of the various bridges A, B and C through the battery.

Having connection to the intermediate points 16 and 17 of each bridge is a load sensitive resistance, resistance 18 having connection to bridge A, resistance 19 to bridge B and resistance 20 to bridge C. These resistances 18, 19 and 20 are connected in the general shape of the triangle 21, the resistances however being insulated from each other by corner terminal connectors 22. Each of these resistances 18, 19 and 20 is formed of a composition metal having a substantially linear co-efficient of expansion for heat such as silver-platinum so that under the influence of heat, an appreciable extension of the length of the wire results, depending upon the length of wire and the changes of temperature with reference to ambient temperature.

Figure 6:
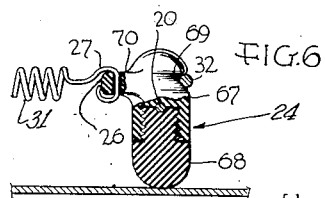
Fig. 6 is a detail of the spring support of the instrument.

At the center point of each of the resistance wires 18, 19 and 20 are a series of ceramic or other preferably refractory non-conducting guides or spools 23, 24 and 25 which serve also as spring attaching means as shown in Figure 6 of the drawings. This figure indicates the spool 24, for example, fixedly secured to the mid-point of the wire 20 with a loop 26 in the plane of the triangle 21 and adapted to receive the end 27 of a coil spring 31, the other end of which (Figs. 2, 7 and 8) is fixed to a ring or plate 29 of ceramic, plastic, or rubber substance of electrically non-conducting nature. Corresponding to this structure as applied to wire 20 and guide 24, are springs 28 and 30 connected to corresponding wires 18 and 19, the points of connection of these springs to the ring 29 being approximately 120° apart. This ring with its associated springs 28, 30 and 31 and in connection with the resistance wires 18, 19 and 20 constitutes an indicating means for the center of gravity for the cargo load as will be more fully explained hereinafter.

In addition to the gravity determination apparatus, there is provided means for determining the weight of the cargo as related to the right, left and nose struts, the apparatus functioning to indicate the summation of the total weight in pounds of the airplane cargo. For this purpose connection is made to the ceramic guide 25 of the end of a silk or wire cable 32, the attachment being fixed at the mid-point thereof. The cable leads around the guides 23, 24 and 25 and is led subsequently to the spool or reel 33. As shown in Fig. 7 the reel has an annular groove 34 on at least a segment of the periphery in which groove the cable 32 is adapted for movement. The end of the cable is wound around a pin fitting in the spool edge and provided with means such as a cross slot for adjustment. Through this means the temperature setting of the meter needle is made, as will be described more fully hereinafter. The spool 33 moves on a central pivot 37 and is normally urged in the direction indicated by the arrow in Fig. 7 by means of a coil spring 38, one end of which is fixed to the support and the other end to a pin fastened to the side of the drum. The meter needle 40 extends radially outwardly from the pivot pin 37 and is normally urged in the direction of the arrow by the spring 38. Its position on the scale depends upon the amount of take-up or let-off in the cable 32. The dial sector 41 is formed in a cover plate and is graduated in pounds.

The operation of the apparatus may now be described. It is assumed that the cargo space of the fuselage is empty and consequently load sensitive resistances 10 and 11 in the strut bridges A, B and C have equal values and with the closure of switch 15 current flow from points 12 to 13 in each bridge fails to produce a difference in potential between points 16 and 17. Consequently, there is no current flow through the indicator resistance wires 18, 19 and 20 and the gravity plate 29 remains in the center of the triangle 20 and in concentric relation to a normal center point 50 of the dial plate positioned below the same. Also since the wires 18, 19 and 20 have their normal minimum length and assuming that temperature adjustment has been made by the pin 35, the needle 40 of the pound weight indicating meter is at its zero position.

Should, however, a load be placed in the cargo space of the plane and the same be uniformly distributed so that there is equal weight bearing on each of the three supporting struts, an increase of resistance will develop in wires 11 and a decrease in resistance in wires 10, in the bridges A, B and C, with the result that the voltage points 16 and 17 are shifted in opposite directions giving a total cross voltage sufficient to send a heating current through the wires 18 and 19 and 20 of substantially equal amounts. This results in an elongation of these wires in accordance with the current flow and consequent inward movement of the guide points 23, 24 and 25 under the influence of the springs 28 and 30 and 31. Since the degree of elongation is equal in all of the wires of the unit 20, the gravity ring 29 remains at substantially the same point, thus indicating a uniformity of weight distribution in the cargo space.

If instead of an equal placement of the load there should be an unequal distribution with the nose and the right rear side wheel struts under major stresses, indicator resistance wires 18 and 19 would be correspondingly heated and the gravity plate would move toward the right with reference to the center point of reference 50 as indicated in Fig. 8 of the drawing. Simultaneously the weight needle 40 would move to the right in summation of the total weight placed within the cargo space. Thus there would be secured a combined indication of the distribution of load and the total poundage involved.

Figure 1:
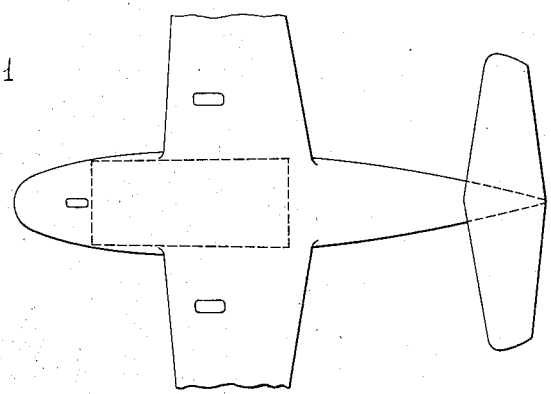
Fig. 1 is a view showing the outline of an airplane with the cargo space indicated by dotted lines.
Figure 2:
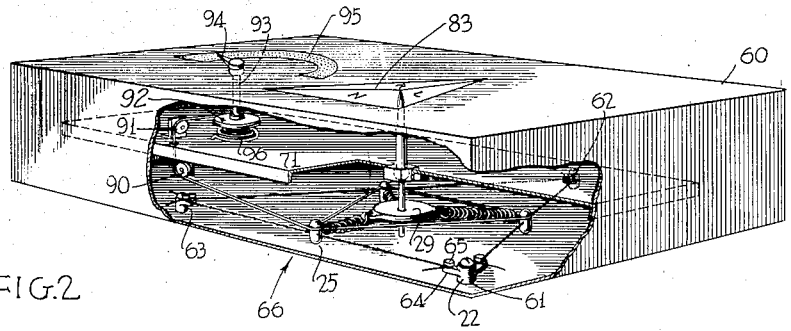
Fig. 2 is a view with parts broken away of an instrument for indicating the total weight of the cargo and the center of gravity with reference to the cargo space.

I have shown in Fig. 2 an instrument 66 provided with a practical adaptation of the operating mechanism hereinbefore described. This instrument consists of a casing 60 on the base of which are fixed at spaced triangular points the cable or wire attachment elements 61, 62 and 63. These elements are each provided with lugs 64 having screws 65 thereon adapted to fix in position the resistance wires coming from the various bridge circuits. At mid-points between these bearings are attached the ceramic or other spring and cable supporting elements as shown in detail in Fig. 6. Each of these spring supports includes an insulating cap member 67 and a support member 68 with which the cap member is in threaded engagement. The support member is rounded on its lower end to form a sliding contact with the base of the instrument casing. The cap member is of insulating material and is adapted to clamp the resistance wire against the supporting member 68 as shown in Fig. 6. Also the cap is provided with a recess 69 to receive the cable 32 having connection to the weight indicator. The lug 70 having an opening therein is adapted to receive one end of the gravity center springs 28, 30 and 31.

Supported in the casing 60 between the upper and lower plates thereof is a shelf 71 fixed to the casing walls. In this shelf, an opening is formed directly above the normal center 50 of the gravity plate, the opening having down turned flanges 72 adapted to retain a support member 73. This member is provided with a central aperture with an annular curved surface thereon to form a bearing for the indicator pin as will now be described. The indicator pin, generally indicated by the numeral 74, comprises a lower section 75 loosely engaging the wedge-shaped aperture 76 formed in the center of gravity plate 29 and connecting at its upper end with a tubular section 77 adapted to house a coil spring 78 against which a pin 79 normally has movement. The lower end of the tubular member 77 is formed as a bulbous terminal 80 which has an exterior contour of a curvature similar to that of the annular surface formed on the member 73. In assembling the structure the bulbous terminal 80 is positioned in the curvilinear surface of the support 73 so that the pin consequently has a universal bearing in relationship to the shelf 71.

The upper terminal of the pin 79 is conical, coming to a point 81 which bears on a triangular glass plate 82. The glass plate is fixed in the upper surface of the casing 60 so that its center is directly above the normal or no-load center of the spring-held plate 29. Thus it will be seen that when there is no current in the resistance wires or when the current in these wires is uniform so that the plate aperture 76 is directly above the no-load center or zero point of the area of movement, the pin 74 is vertical and the point 81 contacts with the glass at the center of the same. This center may be indicated by the junction of lines 83 which divide the triangular surface into sections indicated by the letters N, R and L, standing for Nose, Right and Left, which are in turn related to the sections of the cargo space of the plane. Thus, in use of the apparatus, the movement of the point into the N area indicates the center of gravity of load in the nose section of the cargo chamber. Since the pin 74 has universal movement, the precise position of the center of gravity of the cargo may be determined by the indication of the pin point in relation to the dividing lines 83.

The cable 32, the end of which is secured to guide 25, passes from this element around the other two elements and again around the element to which it is attached and over guide rollers 90 and 91 on the lower and upper sides respectively of the lower shelf 71 to a reel 92. This reel is apertured at its center to receive a pin 93, the upper end of which protrudes through the upper surface of casing 60 and forms the support for a pointer 94. The indicating sector 95, having appropriate indicia calibrated in pounds, preferably is formed on the upper surface of casing 60 so as to underlie indicator 94 as it rotates with the pin 93. A coil spring 96 is secured to the reel 92 and the shelf 71 to urge the indicator 94 toward the maximum reading of the indicating sector. It will be apparent that as described in connection with the Figs. 7 and 8 of the drawing the presence of a weighted cargo inside of the cargo space would result in inward movement of the cable supports 69, and will register the total weight of the cargo on the indicating sector of the instrument.

It is pointed out that the pressure of coil spring 78 in the indicator pin 74 is light so as to impart no appreciable resistance to the movement of the point 81.

As previously mentioned the combined gravity and weight indicator has general application and has been described in connection with cargo planes only, to facilitate the disclosure. Also, while the description has been centered on weight and center of gravity under static conditions, adaptations to movable bodies is apparent. The specific devices have been indicated but these are, of course, subject to modifications.

Various other modifications may be made and hence no other limitations are implied other than as required by the scope of the claims hereto appended.

What is claimed is:

1. A weight indicator comprising at least three electrically energized load sensitive elements positionally spaced with reference to each other, linearly shaped electrical resistance elements, one connected to each of said load sensitive elements and subject to linear elongation or contraction in accordance with current change induced by load variation in the corresponding load sensitive element, and means for automatically summing the total indications of said load sensitive elements, said means including a flexible cable fixed at one end to one of said resistance elements and at the other end to a dial indicator, and having sliding connection with the others of said resistance elements.

2. In a weight indicating apparatus, three electric resistance wires insulated from each other and subject to length change with current variation, a cable connected at one end to one of said wires and having slidable connection to the others of said wires, a dial indicator to which the other end of the cable is connected, and plural weight responsive means adapted for positional distribution on supports for a weighted body for varying the current flow through said wires in proportion to weight variation of said body, each of said resistance wires forming in its entirety one branch of a triangle.

3. A combined gravity center and weight indicator comprising a support, electrical resistance wires susceptible to length variation through current flow therein symmetrically positioned on said support with reference to each other, a gravity center indicating element between said wires, springs connecting a uniform intermediate point on each of the wires to equally spaced points on said element, a dial drum, a cable connecting said drum to one of said wire intermediate points, said cable having sliding contact with the others of said wire intermediate points, yieldable means for reeling said cable on said drum, load sensitive elements adapted for placement on a loaded body and individually connected to said wires, said elements producing current changes in said wires with load stresses.

4. An indicating system comprising a source of current, three elements connected to said source, each subject to electrical resistance variation in accordance with change in pressure thereon, a separate electrical resistance element having the characteristic of linear elongation with increase of current flow connected to each of said pressure responsive elements, and single means connected to each of said resistance elements for indicating a proportionate change of length of said elements with current change therein.

5. A weight indicator comprising an electric current source, symmetrically positioned linearly shaped electric resistance elements deriving current from said source and subject to elongation and contraction with current change therein, separate control means connected to each of said elements for varying the current therein, a cable secured at one end to the mid-point of one of said elements and slidably connected to the mid-point of the other of said elements, and a spring held dial indicator to which the other end of said cable is connected.

6. A weight indicating mechanism for a support adapted to receive a variable load comprising electrical resistance wires symmetrically positioned on a common base, said wires being insulated from each other and subject to change of length on variation of current, an indicating element, springs connecting the centers of said wires to points on said indicating element, and separate means mounted at spaced points on said support and individually connected to each of said resistance wires for varying the current flow therethrough independently in accordance with weight variation at said spaced points on said support, whereby the length of the wires and the position of the connected indicating element is varied.

7. A gravity center indicator for a weighted body having a plurality of spaced supports, comprising a base, electrical resistance wires insulated from each other and symmetrically positioned on said base and subject to length change in accordance with variation in current flow therethrough, an indicating element associated with said base, springs connecting intermediate points on said wires to points equally spaced on said indicating element, and separate electrical means mounted on the supports of the weighted body and connected individually to respective ones of said resistance elements for varying the current therethrough independently in accordance with weight variation on each of said body supports.

8. A combined gravity center and weight indicating apparatus for a support adapted to receive a load comprising an indicia plate zoned to indicate corresponding sections of the support, a pointer mounted for universal movement over said plate for gravity center indication, a weight indicator for the load on said support, an operating unit for simultaneous actuation of the weight indicator and pointer; and weight responsive means connected to said support and operating unit for activating said operating unit.

9. A gravity center indicator for load supporting means, comprising a base having reference indicia thereon, three extensible wires of equal length mounted as a triangle on said base, an indicating means adjacent said base within said triangle and adapted to cooperate with said indicia to indicate the center of gravity of said load supporting means, separate means mounted at spaced points on said supporting means and severally connected to said wires for producing variation in the length of the wires in accordance with the variation in load at said spaced points, and means connected to said indicating means and wires for imparting universal movement to said indicating means in accordance with variation in length of each of said wires.

HENRY RICHARD DAVIES.

REFERENCES CITED

The following references are of record in the file of this patent:

UNITED STATES PATENTS

| Number | Name | Date |
| --- | --- | --- |
| Re. 14,475 | Troll | May 21, 1918 |
| 665,862 | Asch | Jan. 15, 1901 |
| 923,240 | Bradford | June 1, 1909 |
| 952,778 | Wohl et al. | Mar. 22, 1910 |
| 1,131,412 | Parks | Mar. 9, 1915 |
| 1,407,078 | Murray | Feb. 21, 1922 |
| 1,766,355 | Redman | June 24, 1930 |
| 1,864,876 | Westrum | June 28, 1932 |
| 2,052,116 | Strauss | Aug. 25, 1936 |
| 2,124,960 | Waring et al. | July 26, 1938 |
| 2,255,814 | Roche | Sept. 16, 1941 |
| 2,336,142 | Watson | Dec. 7, 1943 |

FOREIGN PATENTS

| Number | Country | Date |
| --- | --- | --- |
| 159,203 | Great Britain | June 16, 1922 |
| 387,887 | Great Britain | Feb. 16, 1933 |
| 549,140 | Great Britain | Nov. 9, 1942 |